(12) United States Patent
Maeder et al.

(10) Patent No.: US 11,234,215 B2
(45) Date of Patent: Jan. 25, 2022

(54) METHOD FOR OPERATING A NETWORK ENTITY FOR A CELLULAR RADIO COMMUNICATIONS NETWORK AND NETWORK ENTITY FOR A CELLULAR RADIO COMMUNICATIONS NETWORK

(71) Applicant: Nokia Technologies Oy, Espoo (FI)

(72) Inventors: Andreas Maeder, Wuerzburg (DE); Athul Prasad, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 16/642,658

(22) PCT Filed: Aug. 31, 2017

(86) PCT No.: PCT/EP2017/071923
§ 371 (c)(1),
(2) Date: Feb. 27, 2020

(87) PCT Pub. No.: WO2019/042560
PCT Pub. Date: Mar. 7, 2019

(65) Prior Publication Data
US 2020/0267691 A1   Aug. 20, 2020

(51) Int. Cl.
*H04L 5/00* (2006.01)
*H04W 72/00* (2009.01)
*H04W 76/40* (2018.01)

(52) U.S. Cl.
CPC ......... *H04W 72/005* (2013.01); *H04W 76/40* (2018.02)

(58) Field of Classification Search
CPC ... H04W 72/10; H04W 72/005; H04W 76/40; H04W 72/048; H04W 72/0486; H04W 72/082
See application file for complete search history.

(56) References Cited

U.S. PATENT DOCUMENTS 8,243,642 B2   8/2012   Bakker et al.
8,472,380 B2   6/2013   Etemad et al.
(Continued)

FOREIGN PATENT DOCUMENTS

EP   3 200 498 A1   8/2017
EP   3 577 856      8/2018
(Continued)

OTHER PUBLICATIONS

3$^{rd}$ Generation Partnership Project; Technical Specification Group Radio Access Network; NR; NR and NG-RAN Overall Description; Stage 2 (Release 15), 3GPP TS 38.300 V0.4.1, pp. 1-55, (Jun. 2017).
(Continued)

*Primary Examiner* — Phuoc H Doan
(74) *Attorney, Agent, or Firm* — Fay Sharpe LLP

(57) ABSTRACT

A method for operating a network entity (gNB) for a cellular radio access network (RCN) is proposed, the method comprising: determining at least one downlink radio condition of the cellular radio access network (RCN); determining user equipments subscribing to a content flow (HPF-1; HPF-2; LPF-1; LPF-2), wherein the content flow (HPF-1; HPF-2; LPF-1; LPF-2) is associated with at least one flow property; mapping the content flow (HPF-1; HPF-2; LPF-1; LPF-2) to at least one radio bearer in dependence on the at least one downlink radio condition and in dependence on the at least one flow property; receiving the content flow (HPF-1; HPF-2; LPF-1; LPF-2); and transmitting the content flow (HPF-1; HPF-2; LPF-1; LPF-2) according to the determined at least one mapping to the subscribing user equipments.

20 Claims, 9 Drawing Sheets

(56) References Cited

U.S. PATENT DOCUMENTS

| | | |
|---|---|---|
| 2008/0025241 A1 | 1/2008 | Bhushan et al. |
| 2008/0253322 A1 | 10/2008 | So et al. |
| 2013/0028118 A1 | 1/2013 | Cherian et al. |
| 2013/0148597 A1 | 6/2013 | Lee et al. |
| 2013/0148605 A1* | 6/2013 | Jin .................... H04W 72/1242 370/329 |
| 2014/0362694 A1 | 12/2014 | Rodrigues |
| 2017/0070864 A1 | 3/2017 | Dabak et al. |

FOREIGN PATENT DOCUMENTS

| | | |
|---|---|---|
| WO | WO 2005/027543 A1 | 3/2005 |
| WO | WO 2013/127665 A1 | 9/2013 |
| WO | WO 2017/099520 A1 | 6/2017 |
| WO | WO 2017/131690 A1 | 8/2017 |

OTHER PUBLICATIONS

Ali A. Zaidi et al., "Waveform and Numerology to Support 5G Services and Requirements," IEEE Communications Magazine, pp. 90-98, Nov. 2016.

Athul Prasad et al., "Enabling group communication for public safety in LTE-Advanced networks," Elsevier—Journal of Network and Computer Applications, vol. 62, pp. 41-52, 2016.

Marcus Konrad et al., "Throughput Based Switching Threshold for Multicast and Unicast in Cellular OFDM Networks," IEEE, pp. 1927-1931, 2007.

International Search Report for PCT/EP2017/071923 dated May 4, 2018.

* cited by examiner

METHOD FOR OPERATING A NETWORK ENTITY FOR A CELLULAR RADIO COMMUNICATIONS NETWORK AND NETWORK ENTITY FOR A CELLULAR RADIO COMMUNICATIONS NETWORK

FIELD OF THE INVENTION

The invention relates to a method for operating a network entity for a cellular radio communications network and to a network entity for a cellular radio communications network.

BACKGROUND

In traditional networks, if there is a common content intended for mass delivery, it is always delivered using multicast/broadcast, MC/BC, since there are separate and dedicated user plane nodes and entities handling such traffic flows.

The standardization efforts for 5G systems have already started as part of 3GPP Release-14, with diverse set of requirements ranging from very high data rates up to 20 Gbps to ultra-reliable communications with air interface packet error probability down to $10^{-5}$ along with ultra-low-latency systems of 1 ms end-to-end latency.

In terms of practical deployments, there is a wide range of frequency bands currently being considered, due to the lack of availability of contiguous bands below 3 GHz. One of the key frequency band, where there is a potential for significant amount of bandwidth available, for eMBB type of use cases, is the mmW band above 27 GHz. The higher bandwidth would also be essential for supporting ultra-low-latency use cases, but with data rates compromised for higher reliability and lower latency.

SUMMARY

According to a first aspect a method for operating a network entity for a cellular radio access network is provided, the method comprising: determining at least one downlink radio condition of the cellular radio access network; determining user equipments subscribing to a content flow, wherein the content flow is associated with at least one flow property; mapping the content flow to at least one radio bearer in dependence on the at least one downlink radio condition and in dependence on the at least one flow property; receiving the content flow; and transmitting the content flow according to the determined at least one mapping to the subscribing user equipments.

According to a second aspect a network entity for a cellular radio access network is provided, wherein the network entity comprises at least a processor, a memory, and a radio module, and wherein the network entity is configured to: determine at least one downlink radio condition of the cellular radio access network; determine user equipments subscribing to a content flow, wherein the content flow is associated with at least one flow property; map the content flow to at least one radio bearer in dependence on the at least one downlink radio condition and in dependence on the at least one flow property; receive the content flow; and transmit the content flow according to the determined at least one mapping to the subscribing user equipments.

One requirement of the delivery of content flow is extremely high data-rate that is expected to be fulfilled by eMBB, enhanced Mobile Broadband, type of communications in 5G. For such content delivery, there is strict requirement in terms of latency (of up to 7 ms over the air interface for virtual reality/VR). Advantageously, the provisioning of at least one radio bearer is the basis for the delivery of high-quality media content using either unicast or multicast/broadcast—the flexible delivery of which is called XCast in 5G. Therefore, the provided method and the provided network entity fulfill these requirements and avoid jitter or motion sickness for the end users.

In terms of capacity, the requirements are usually up to 1 Gbps per user, depending on the quality of the VR/augmented reality (AR) content. So the delivery of such content by means of the provided scheme is an ideal mode of transmission for 5G. There are number of practical use cases such as VR movie theatres, sports arenas that could be enable practical deployment of such content delivery mechanisms.

So a flexible switch between the various possible content delivery mechanisms such as unicast, multicast or broadcast is enabled. Especially with mmW deployments, switching between various XCast transmissions schemes involves a reduction of cost in terms of signaling and feedback configuration, especially for MC/BC service flows, as compared to unicast services flows. Consequently, the provided scheme maximizes the radio resource efficiency over the air interface.

In scenarios where the high-quality, high data rate VR/AR broadcast is expected to be deployed, there are high probabilities of having significantly varying number of users, which requires a flexible, adaptable and configurable new radio system. Such problems gain increasing relevance while deploying general purpose, standardized radios to support new verticals, use cases, and markets.

Since the network entity needs to support all types of traffic, there could be some content flows which are low-capacity/low-data rate traffic, for which the operator would like to broadcast the data over-the-air, irrespective of whether all the users receive such traffic. When such a flow is received at the network entity, the network entity can prioritize the delivery using the provided scheme. Thus, using the provided scheme the network entity has the ability to schedule True-Xcast traffic over appropriate radio bearers or using other mechanisms for over-the-air transmission. Moreover, the network operators gain a flexibility on how they would like to prioritize such traffic.

An advantageous embodiment is characterised in that the mapping comprises: selecting a unicast mapping of the content flow to a plurality of unicast bearers between the network entity and the subscribing user equipments if the downlink radio condition permits the operation of the unicast mapping and if the flow property indicates the use of the unicast mapping, or selecting a multicast mapping of the content flow to a multicast bearer between the network entity and the subscribing user equipments if the downlink radio condition constrains the operation of the unicast mapping and if the flow property indicates the use of the unicast mapping. This enables the base station to schedule the Xcast traffic over-the-air, using the best possible means of delivery.

Advantageously, unicast is prioritized over multicast for high-priority/reliability, high-data rate, low latency traffic, for which the corresponding flow property indicates the use of the multicast mapping. If the content can be delivered only using multicast, for example due to large and randomly distributed users, appropriate optimizations of radio parameters can be undertaken over the air interface for reliable and low-latency content delivery. This enables the network entity to schedule the high-priority traffic using unicast, if there are sufficient radio resources available in the air interface, thereby improving reliability.

An advantageous embodiment is characterised in that the mapping comprises: selecting the multicast mapping and/or a broadcast mapping of the content flow to the multicast bearer between the network entity and the subscribing user equipments if the downlink radio condition permits the operation of the multicast mapping and if the flow property indicates the use of the multicast mapping, or selecting the unicast mapping of the content flow to the plurality of unicast bearers between the network entity and the subscribing user equipments if the downlink radio condition constrains the operation of the multicast mapping and if the flow property indicates the use of the multicast mapping.

Advantageously, multicast and/or broadcast is prioritized over unicast for low-priority/reliability, low-data rate, non-critical latency traffic, for which the corresponding flow property indicates the use of the multicast mapping.

An advantageous embodiment is characterised in that the mapping comprises: selecting a multicast mapping of the content flow to a multicast bearer between the network entity and a first group of the subscribing user equipments and a unicast mapping of the content flow to a plurality of unicast bearers between the network entity and a second group of the subscribing user equipments if the downlink radio condition permits the simultaneous operation of the multicast and the unicast mapping and if the indicates the simultaneous operation, or selecting the multicast mapping of the content flow to the multicast bearer between the network entity and the subscribing user equipments if the downlink radio condition constrains the simultaneous operation of the multicast and the unicast mapping and if the flow property indicates the simultaneous operation.

Advantageously a mixed radio bearer scheme is provided for one single content flow. For example, UEs residing near the antenna may be served using a multicast radio bearer whereas the UEs far away from the antenna are served using a unicast radio bearer. This enables radio resource efficient delivery of the traffic over-the-air for example with the dynamic usage or mapping of multicast/broadcast for users close to the base station and unicast for the far-away or cell-edge users.

An advantageous embodiment is characterised in that the radio condition comprises at least one of the following: high/low radio load, a number of available downlink radio resources, a capability indication from the respective user equipment.

An advantageous embodiment is characterised in that the downlink radio condition comprises a plurality of downlink radio measurements, the method further comprising: transmitting from an antenna array a temporal sequence of control signal beams, wherein the control signal beams radiate from the antenna array in a set of distinct directional patterns, wherein each transmitted control signal beam contains a beam index; receiving the downlink radio measurements from a plurality of user equipments, wherein each of the received downlink radio measurements comprises the respective beam index of a control signal beam and a corresponding received signal strength.

A beam-based system design with content delivered to a multitude of users through XCast beams (beams having uni-, multi- or broad-cast content) is considered here. For example, an indoor viewing arena with several UEs receiving content through n beams from the network entity gNB, also termed gigabit node B or base station. Advantageously, the proposed beam based approach provides the required amount of coverage and connectivity throughout the coverage footprint of the cell.

An advantageous embodiment is characterised in that the method comprises: determining a plurality of downlink signal beams to the subscribing user equipments with a respective minimum signal strength; determining the multicast mapping comprising the plurality of downlink signal beams; and transmitting the content flow according to the determined multicast mapping to the subscribing user equipments.

An advantageous embodiment is characterised in that the method comprises: determining a respective downlink signal beam to the subscribing user equipments with a maximum signal strength; determining the respective unicast mapping comprising the respective downlink signal beam with the maximum signal strength; and transmitting the unicast content flow according to the determined unicast mappings to the subscribing user equipments.

An advantageous embodiment is characterised in that the unicast bearers differ at least pairwise in a radio numerology. By considering the flexible numerology paradigm, which will be an integral part of the 5G PHY layer design, an adaptive selection of the physical layer numerology used over the air interface for example depending on the frequency band of operation or air interface variant used is enabled.

An advantageous embodiment is characterised in that the flow property comprises at least one of the following: a flow priority, a flow reliability, a data rate, a latency constraint, a Quality of Service, QoS class identifier, a QoS Flow Identity, QFI value, and a 5G QoS Indicator, 5QI value.

An advantageous embodiment is characterised in that the downlink radio condition comprises a plurality of downlink radio resources available for the at least one mapping.

An advantageous embodiment is characterised in that the method comprises: aggregating downlink radio conditions from a plurality of sub-entities; and mapping the content flow to the at least one radio bearer in dependence on the aggregated downlink radio conditions and in dependence on the at least one flow property; providing the determined mapping to the sub-entities; and receiving the content flow at the sub-entity; and transmitting the content flow according to the determined at least one mapping from the respective sub-entity to at least a group of the subscribing user equipments.

DESCRIPTION OF THE EMBODIMENTS

Figure 1:
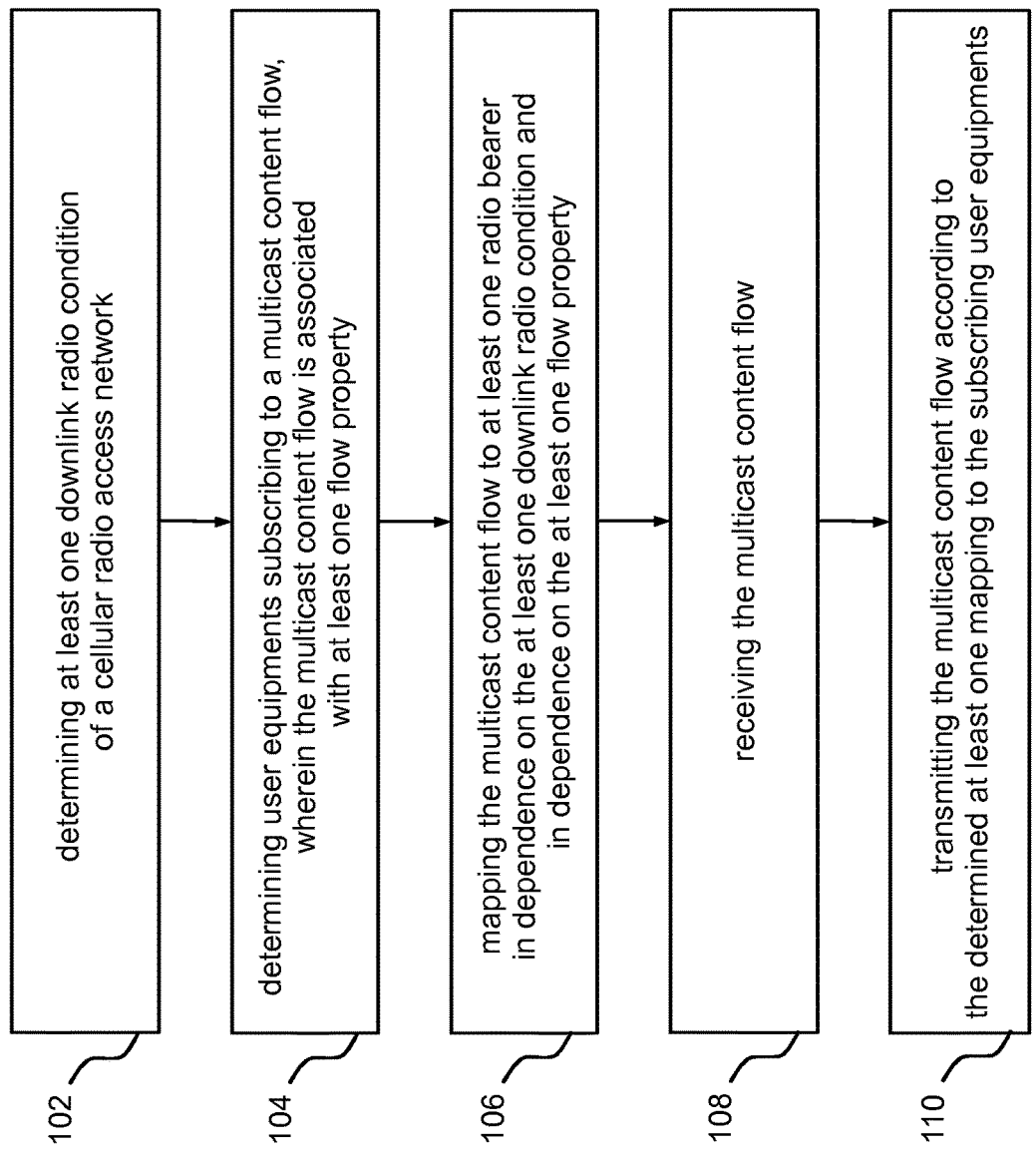
FIGS. 1, 3*b* and 7 each depicts a schematic flow diagram to operate a network entity.

FIG. 1 depicts a schematic flow diagram to operate a network entity for a cellular radio access network. In a step 102, at least one downlink radio condition of the cellular radio access network is determined. In a step 104, user equipments subscribing to a content flow are determined, wherein the content flow is associated with at least one flow property. In a step 104, the content flow is mapped to at least one radio bearer in dependence on the at least one downlink radio condition and in dependence on the at least one flow property. In a step 106, the content flow is received. In a step 110, the content flow is transmitted according to the determined at least one mapping to the subscribing user equipments.

Figure 2:
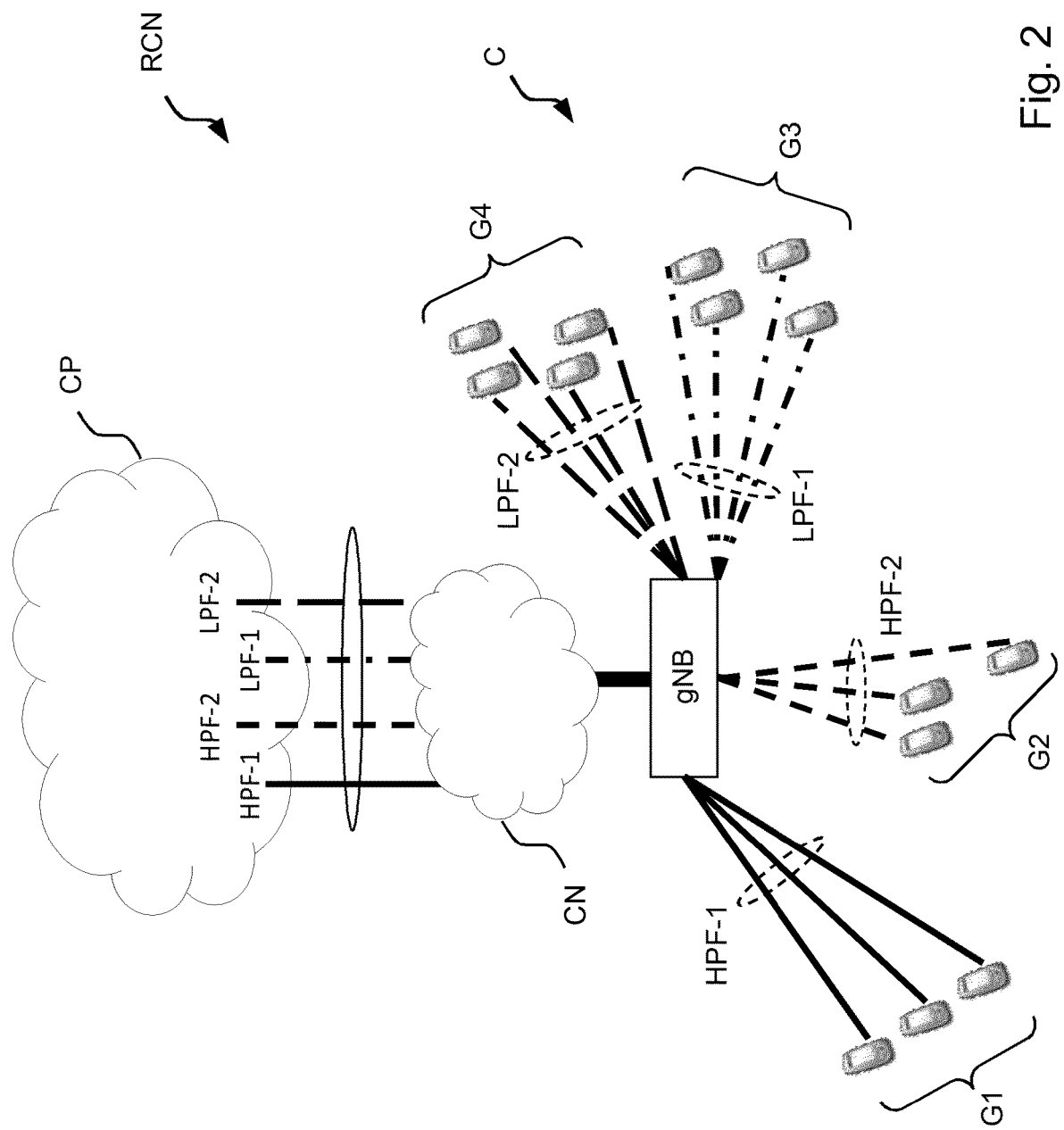
FIGS. 2, 3*a* and 5 each depicts a schematic block diagram of a cellular radio communications network.

FIG. 2 depicts a schematic block diagram of the cellular radio communications network RCN. A content provider CP provides a plurality of content flows HPF-1, HPF-2, LPF-1, LPF-2 to a core network CN, which provides the content flows HPF-1, HPF-2, LPF-1, LPF-2 to a network entity gNB. One of the content flows comprises video, audio or other streaming content which has a multicast character, which implies that a reception by a multitude of end users is desired. The network entity gNB can be also termed eNodeB, base station or the like. The network entity gNB provides a radio coverage according to at least one radio cell C. A plurality of user equipments, UE, reside in the radio cell C and are able to receive the downlink radio telecommunications signal. The user equipment UE is a mobile radio terminal or a machine-type radio terminal.

The network entity gNB determines the at least one radio condition in the radio cell C for a first group G1 of UEs. The UEs of the first group G1 subscribe to the content flow HPF-1. The network entity gNB receives a subscription indication from each of the UEs from the first group G1. In response to this subscription indication at least one bearer to the UEs of the first group G1 is activated or changed. The network entity gNB maps the content flow HPF-1 to the at least one radio bearer to the UEs of the first group G1. This mapping is determined in dependence on the determined at least one radio condition and in dependence on the at least one flow property of the content flow HPF-1. The content flow HPF-1 is received by the network entity gNB. The received content flow HPF-1 is transmitted by the network entity gNB over the air interface to the UEs of the first group G1 according to the determined at least one mapping, wherein the UEs of the first group G1 subscribe to the content flow HPF-1. So, the first group G1 of UEs is served with the content flow HPF-1.

A second group G2 of UEs is served with the content flow HPF-2. A third group G3 of UEs is served with the content flow LPF-1. A fourth group G4 of UEs is served with the content flow LPF-2.

The flow property of each of the content flows HPF-1, HPF-2, LPF-1, LPF-2 comprises at least one of the following: a flow priority, a flow reliability, a data rate, a latency constraint, a Quality of Service, QoS, class identifier, a QFI value, and a 5 QI value. The flow property identifies the respective class or priority of the respective content flow HPF-1, HPF-2, LPF-1, LPF-2.

The downlink radio condition comprises at least one of the following: a plurality of downlink radio resources available for the at least one mapping, a plurality of downlink signal beams and corresponding signal strengths, capability indications from respective UEs. Each of the capability indications comprises a capability of the respective user equipment to attend the unicast bearer, a multicast bearer or a broadcast bearer. The unicast bearer, the multicast bearer and the broadcast bearer can be also termed X-cast bearer.

The at least one radio bearer comprises: a unicast bearer between the network entity gNB and a single UE, a multicast bearer between the network entity gNB and a plurality of UEs, for example one of the groups G1 to G4, a broadcast bearer between the network entity gNB and all UEs in the radio cell C. The unicast bearers may differ at least pairwise in a radio numerology. Moreover, the radio bearers are adapted with respect to their numerology and at least one further radio parameter. The radio numerology comprises a cyclic prefix, a subcarrier spacing, a sampling clock frequency, a DFT size. The at least one radio parameter comprises at least one of the following: beam power, beam width, and beam periodicity.

In the shown scenario, a framework for Xcast content delivery is enabled. Note that there is not necessarily an end-to-end bearer (i.e., EPS bearer) in this scenario. Rather, traffic is marked in the core network CN with QoS flow indicators QFI, for example. The network entity gNB is responsible for mapping content flows to radio bearers (DRB).

So, for low-priority True-Xcast traffic, the gNB may prioritize traffic scheduling over the air using multicast/broadcast. For high-priority traffic, the gNB may prioritize traffic scheduling using unicast if it is practically feasible, else schedule using multicast/broadcast. The network entity gNB takes appropriate actions, based on the signaling from the core network CN. For the high-priority content flow HPF-1, if all the user equipments receiving the respective content flow can be served using unicast, i.e. if there are sufficient radio resources for such a scheduling operation within the QoS constraints in terms of latency, reliability and delays, the content flow HPF-1 is mapped to appropriate unicast data radio bearers (DRBs). If the users cannot be scheduled using unicast, then content flow HPF-1 is scheduled to the end users using appropriate at least one multicast bearer, with appropriate uplink radio bearers configured for feedback in order to ensure reliability and low-latency.

For low-priority content flow LPF-1 with radio resource efficiency constraints, the network entity gNB takes appropriate actions based on the signaling from the core network CN to schedule the traffic over at least one multicast bearer if that would be a radio resource efficient manner to schedule such content flow LPF-1. For low-priority multicast content LPF-2 with no constraints specified, the network entity gNB will schedule such traffic using at least one broadcast bearer over the air interface based on the signaling from the core network CN. This could be applicable for traffic which could be received by UEs in idle/receive-only mode (for e.g., set top boxes, possible mMTC devices, etc.), which are not registered with the mobile network.

Some of the possible over-the-air Xcast content delivery mechanisms, based on priority indications in the sense of flow properties are as shown in FIG. 2. Here the content flow HPF-1 indicates a high-priority flow which needs to be scheduled using unicast if there is sufficient amount of resources available to all the users in order to guarantee low-latency, high-reliability and sufficient data-rates. If there are not enough resources to schedule such traffic using unicast, the traffic could be scheduled using the at least one multicast bearer with optimal radio parameterizations and optimizations in order to ensure that all the users receive the high-quality data content.

In another example case, the content flow HPF-2 indicates a slightly lower-priority in comparison with the content flow HPF-1 and could be scheduled using multicast to users that are closer to cell-center (with radio conditions above a particular threshold) and the cell-edge users could be scheduled using unicast in order to ensure coverage and capacity. The content flow LPF-1 is a possible Xcast flow which prioritizes radio resource efficiency. This implies that the network entity gNB schedules such content in the most radio resource efficient manner over the air, and hence select and Xcast mode which would consume the least amount of physical resource blocks.

As another example for low-priority, the content flow LPF-2 could be meant for receive-only/idle mode UEs within the coverage area of the network, which then always needs to be scheduled either using broadcast or multicast.

For low-priority content flows LFP-1, LPF-2 the network entity gNB calculates an amount of resources required to schedule the traffic using broadcast and unicast. For low-user densities, with UEs having good radio link conditions it could be that unicast would be the most radio resource efficient means of content delivery, whereas in some scenarios with a large number of users uniformly distributed or located in particular hotspots, broadcast content delivery could be more radio resource efficient. Based on the prioritization information in form of the flow property from the core network, the network entity gNB schedules the traffic accordingly over the air. For traffic that should always be sent over the air using multicast or broadcast, the network entity gNB schedules the traffic accordingly. Here further optimizations are possible depending on whether the traffic is scheduled using single frequency networks or single-cell point-to-multipoint manner.

Figure 3A:
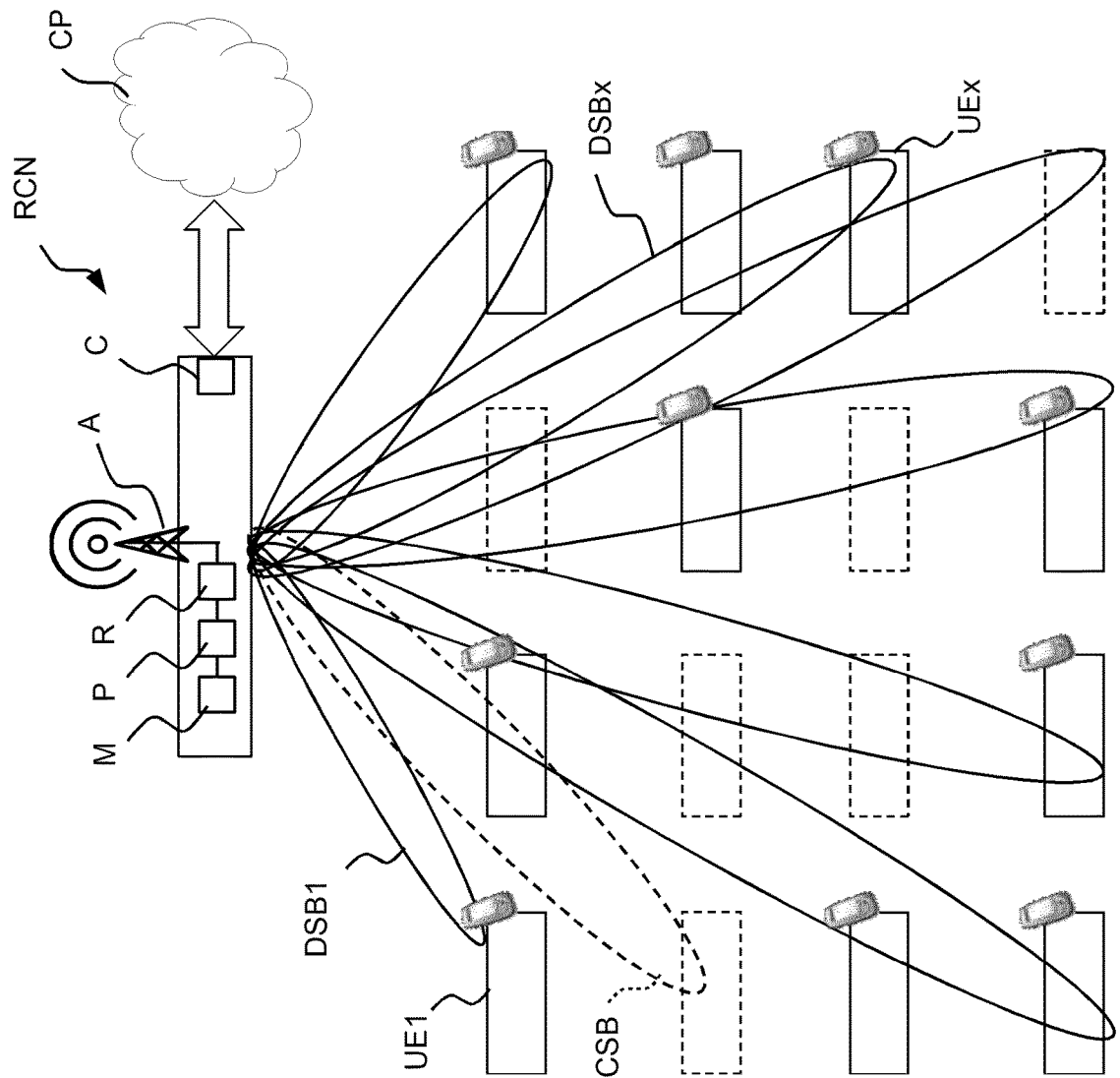

FIG. 3a depicts a schematic block diagram of the cellular radio communications network. The network entity gNB is connected to a stationary antenna A to transmit a downlink radio telecommunications signal and/or to receive an uplink radio telecommunications signal. The antenna A may comprise a plurality of antennas. The antenna A can be a remote radio head or the like. The network entity gNB further comprises a radio module R to communicate via the antenna A, a communication module C to communicate with the content provider CP, a processor P and a memory M. In an embodiment, parts of the functionality of the network entity gNB are virtualized resulting in a plurality of interconnected computing entities realizing the function of the network entity gNB.

The antenna A and the radio module R are configured to send a plurality of control signal beams over the air interface in order to determine downlink signal beams DSB1 to DSBx. An exemplary control signal beam CSB is shown which attains an area where no UE resides. Consequently, the downlink signal beams DSB1 to DSBx are determined for the UEs within the radio cell C to establish radio bearers making use of the determined downlink signal beams DSB1 to DSBx.

Figure 3B:
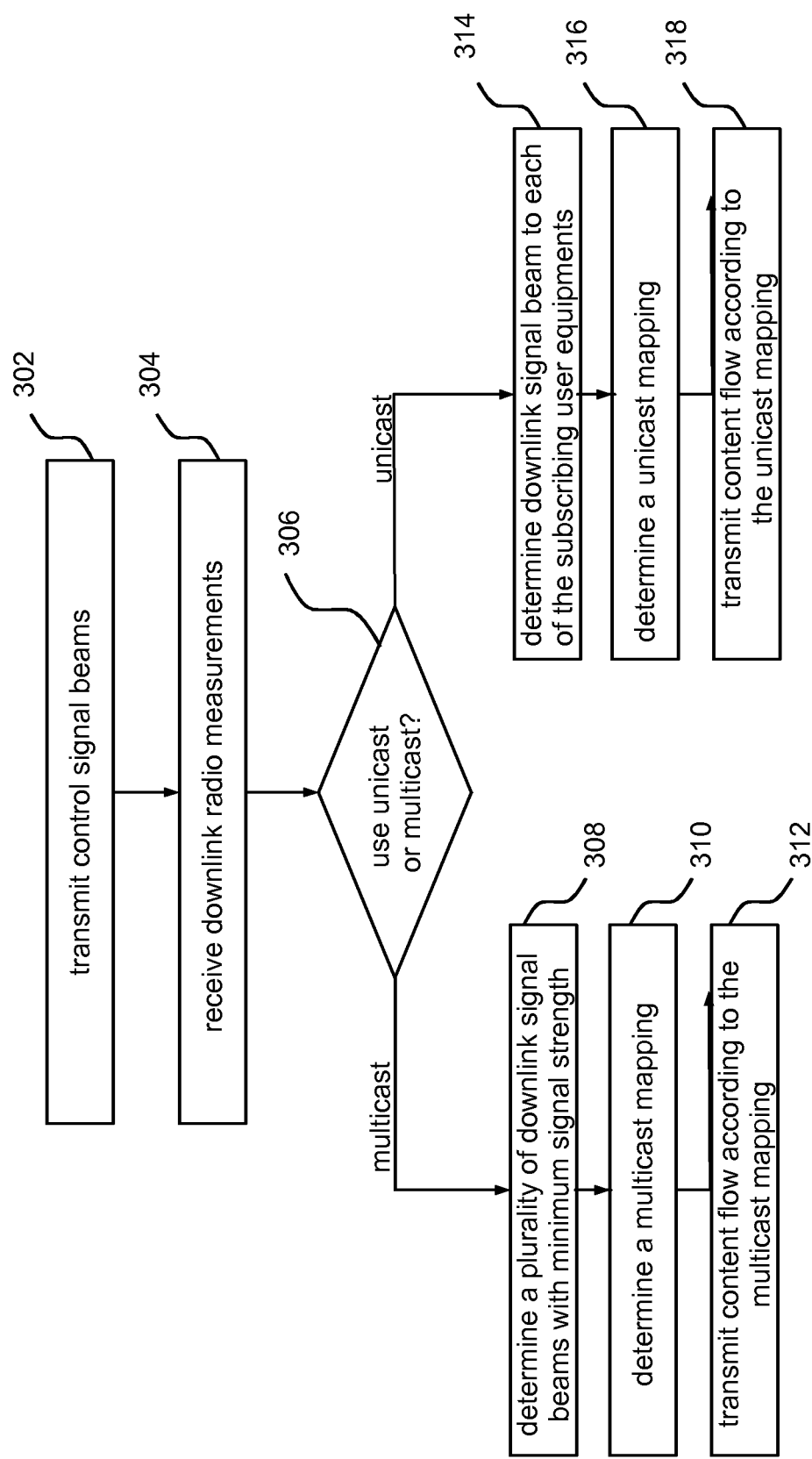

FIG. 3b depicts a schematic flow diagram to operate the network entity. The downlink radio condition comprises a plurality of downlink radio measurements from the UEs. In a step 302, a temporal sequence of control signal beams is transmitted from the antenna array of the antenna of the network entity. The control signal beams radiate from the antenna array in a set of distinct directional patterns, wherein each transmitted control signal beam contains a beam index. In a step 304, the downlink radio measurements are received from a plurality of user equipments, wherein each of the received downlink radio measurements comprises the respective beam index of a control signal beam and a corresponding received signal strength. In a step 306, a determination is made whether a unicast or a multicast bearer has to be set up or changed.

When determining the multicast case in step 306, in a step 308, a plurality of downlink signal beams to the user equipments are determined in dependence on the control signal beams and in dependence on the downlink radio measurements, wherein the user equipments subscribe to one of the content flows. The downlink signal beams have a respective minimum signal strength to cover all the subscribing user equipments. Determining the downlink signal beams for the multicast case reflects a distribution of user equipments in the radio cell. According to a step 310 a multicast mapping is determined, the multicast mapping comprising the plurality of downlink signal beams which have been determined in step 308. In an embodiment, the step 310 comprise a determination of radio parameters to deliver the content flow. In the step 312 the content flow is transmitted over the radio interface according to the determined multicast mapping to the subscribing.

When determining the unicast case in step 306, according to a step 314, a respective downlink signal beam to each of the subscribing user equipments is determined, wherein the determined downlink signal beam has a maximum signal strength. Determining the downlink signal beams for the unicast case reflects a distribution of user equipments in the radio cell. The downlink signal beam is determined in dependence on the control signal beams and in dependence on the downlink radio measurements. In a step 316, a respective unicast mapping comprising the respective downlink signal beam with the maximum signal strength is determined. In an embodiment, the step 316 comprise a determination of whether user equipments can be served using a different numerology and/or different radio parameter. In a step 318, the unicast content flow according to the determined unicast mappings is transmitted to the subscribing user equipments.

Figure 4:
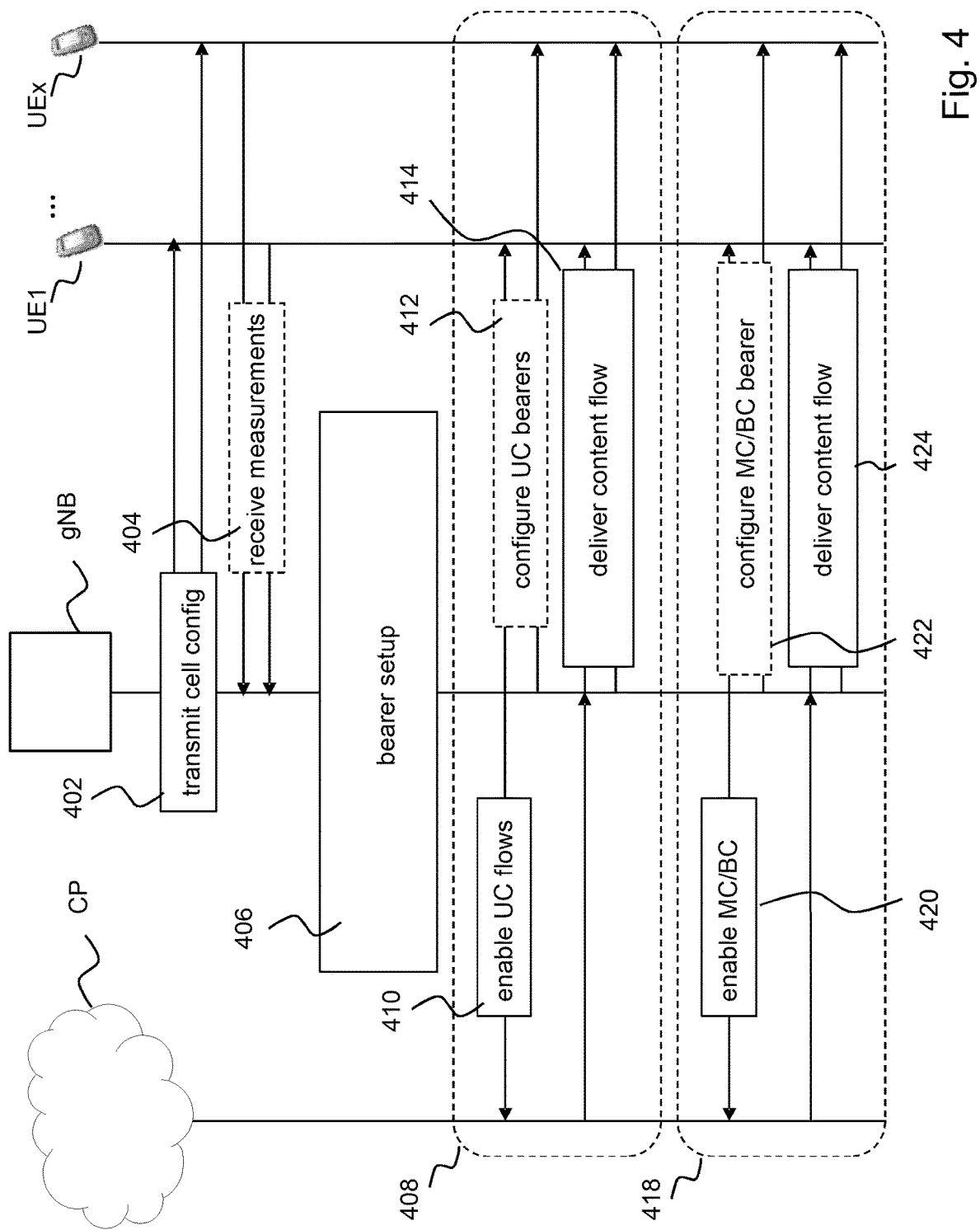
FIGS. 4 and 6 each depicts a schematic sequence diagram for operating the cellular radio communications network.

FIG. 4 depicts a schematic sequence diagram for operating the cellular radio communications network. In a step 402, the network entity gNB transmits a cell configuration message to the user equipments UE1 to UEx. For example, the step 402 comprises the step 203 of FIG. 3b. In a step 404, radio measurements are received from the user equipments UE1 to UEx as a response to the cell configuration message. In a step 406, radio parameters and numerology for a respective bearer are setup or, if necessary, adjusted.

In the unicast case 408 a step 410 enables a plurality of unicast service flows. In a step 412, the unicast bearers are configured including a configuration of beam parameters. In a step 414, the unicast service flows are delivered using the configured unicast bearers to the respective user equipments UE1 to UEx.

In the multicast case 418 a step 420 enables a multicast service flow or a broadcast service flow. In a step 422, the multicast bearer is configured including a configuration of beam parameters. In a step 424, the multicast service flow is delivered using the configured multicast bearer to the respective user equipments UE1 to UEx.

In order to deliver high-quality video content the network entity gNB configures the UEs in step 402 for initial access and related feedback. In step 404 the UEs on receiving the configuration information using system or master information blocks (SIB/MIB), will make appropriate measurements based on the different analogue beams that the gNB transmits, and report the strongest beam IDs and related signal levels. In step 406 the gNB makes the XCast transmission mode selection, based on evaluating the feedback received from the UE, whether using appropriate subcarrier spacing, cyclic prefix, sampling clock frequency/other flexible numerology parameters in combination with radio parameters (such as beam specific parameter adjustments) would enable unicast service flows. It is considered, for example, that the content is delivered in an indoor scenario with limited mobility constraints and possible line of sight with all the users. There could be some possible configuration based on which this mode selection evaluation is done only if the total number of users within the virtual reality viewing arena or other areas where such media content is delivered is below a predefined limit.

If the network entity gNB decides in step 406 to select unicast mode, appropriate signaling is done to the content provider CP to enable end-to-end unicast service flows, which are then scheduled by the network entity gNB to individual UEs using the downlink signal beams. Appropriate feedback configuration for unicast is also made, in order to ensure reliable delivery of the media content. If the network entity gNB decides to select multicast/broadcast mode for delivery, this information is also signaled to the content provider CP in order to enable the multicast/broadcast service flow. Appropriate signaling is also made to the UEs in steps 412, 422 for e.g. using SIB/MIB signaling so that the UEs are aware of the resources that are configured for such content delivery. The network entity gNB then schedules the data corresponding the content flows over the downlink signal beams, in order to ensure efficient delivery. The network entity gNB could select appropriate transmission parameters in terms of numerology and radio parameterization in order to ensure that all the UEs receive the content.

Figure 5:
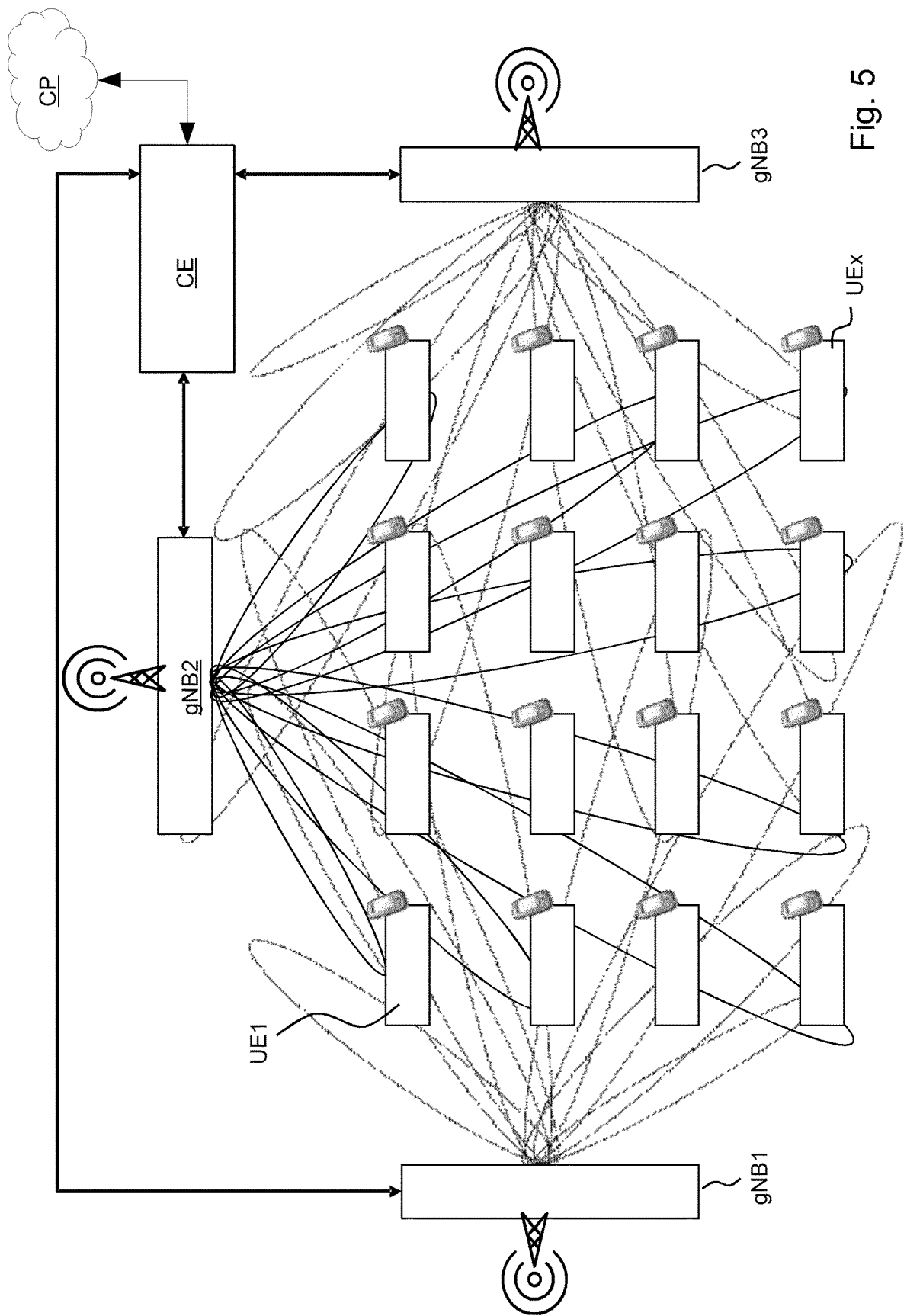

FIG. 5 depicts a schematic block diagram of the cellular radio communications network with a multi network entity gNB deployment scenario. The central entity is collocated with the content provider CP, but it could be a dedicated node or a virtual function collocated with one of the gNBs as well. From the vertical operator perspective, the number of gNBs could depend on ensuring coverage and capacity for all the UEs that could be deployed within the scenario, with the amount of available spectral resources in a cost-efficient manner. So, the user equipments UE1 to UEx can be served at least partly by a plurality of sub-entities gNB1 to gNB3 which are configured to communicate with a central entity CE. The sub-entities gNB1 to gNB3 and the central entity CE constitute the network entity. The central entity CE aggregates downlink radio conditions which are determined at the plurality of sub-entities gNB1 to gNB3. The central entity CE maps the content flow from the content provider CP to the at least one radio bearer in dependence on the aggregated downlink radio conditions and in dependence on the at least one flow property. The central entity CE provides the determined mapping to the sub-entities gNB1 to gNB3, which receive the content flow. The respective sub-entity gNB1 to gNB3 transmits the content flow according to the received at least one mapping to at least a group of the subscribing user equipments UE1 to UEx.

Figure 6:
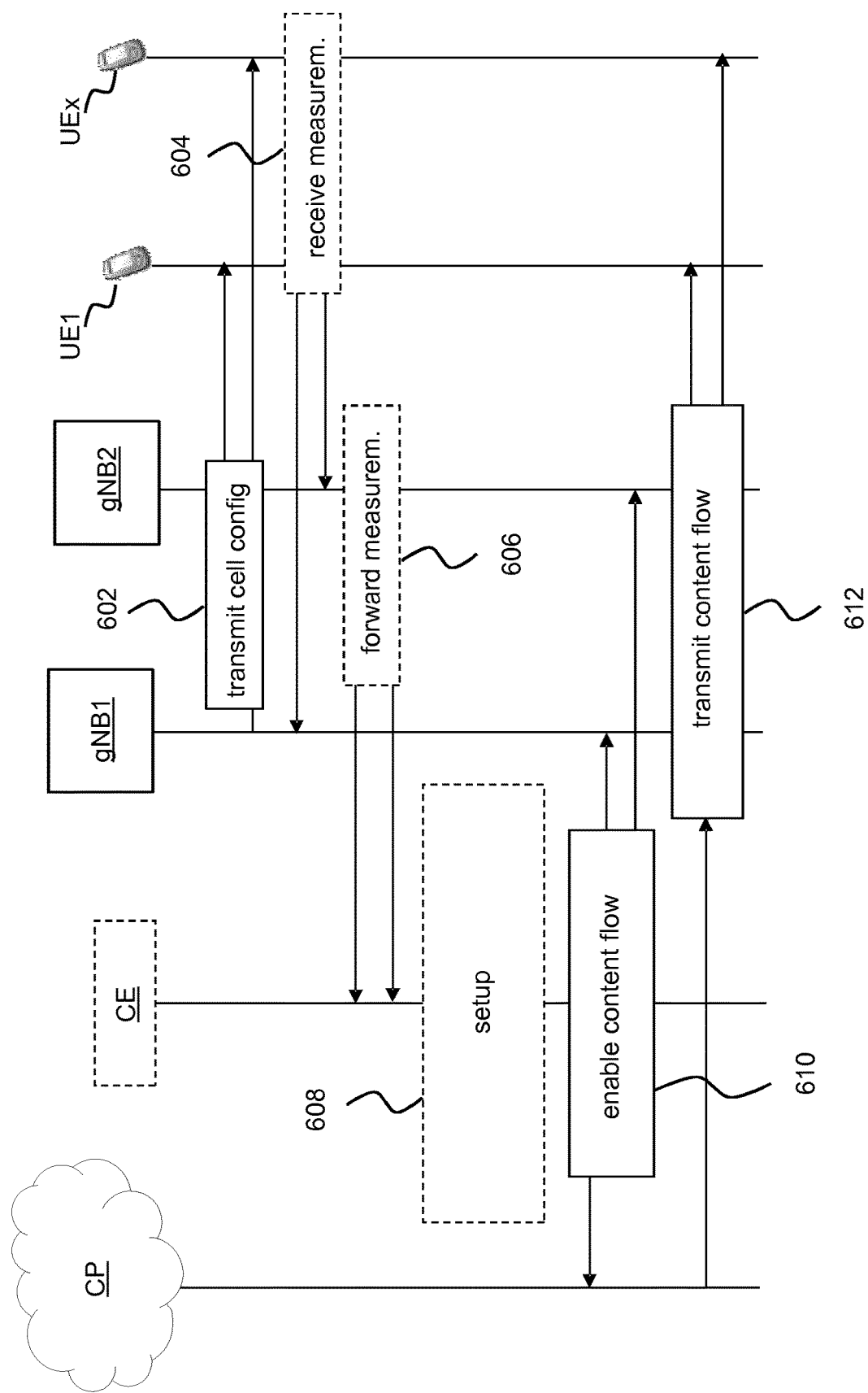

FIG. 6 depicts a schematic sequence diagram for operating the cellular radio communications network of FIG. 5. In a step 602, the sub-entities gNB1 and gNB2 transmit a respective cell configuration message to the user equipments UE1 to UEx. For example, the step 602 comprises the step 203 of FIG. 3b. In a step 604, radio measurements are received by the sub-entities gNB1 and gNB2 from the user equipments UE1 to UEx as a response to the cell configuration messages. In a step 606, the sub-entities gNB1 and gNB2 forward the radio measurements to the central entity CE. In a step 608, radio parameters and numerology for a respective bearer are setup or, if necessary, adjusted by the central entity CE. According to a step 610 the central entity CE enables an appropriate content flow for the respective user equipments and corresponding radio parameters, both being forwarded to the respective sub-entities gNB1, gNB2. In the step 610 the respective bearers are configured including a configuration of beam parameters. In a step 612, the configured content flows are delivered using the configured bearers to the respective user equipments UE1 to UEx.

The individual sub-entities gNBs forward the UE radio measurements to the central entity CE, which then decides whether the content flow is delivered using unicast or broadcast bearers. Ideally for low user distribution, depending on the gNB density and availability, the central entity CE could prioritize unicast after evaluating the signal levels for various user equipments in the system and optimizing the possible numerology/radio parameterization. For higher user distribution, the central entity CE selects a multicast bearer, depending on the user distribution, etc., estimated based on the received feedback. Optionally, the central entity CN could also decide if only a subset of deployed gNBs could be used to serve all the users using XCast content, thereby enabling energy efficient and interference mitigated delivery of content. Once the central entity CN decides the mode of content delivery, the related information is signaled to the content provider CP and gNBs, from where the decision is further propagated to the user equipments UE1 to UEx.

Figure 7:
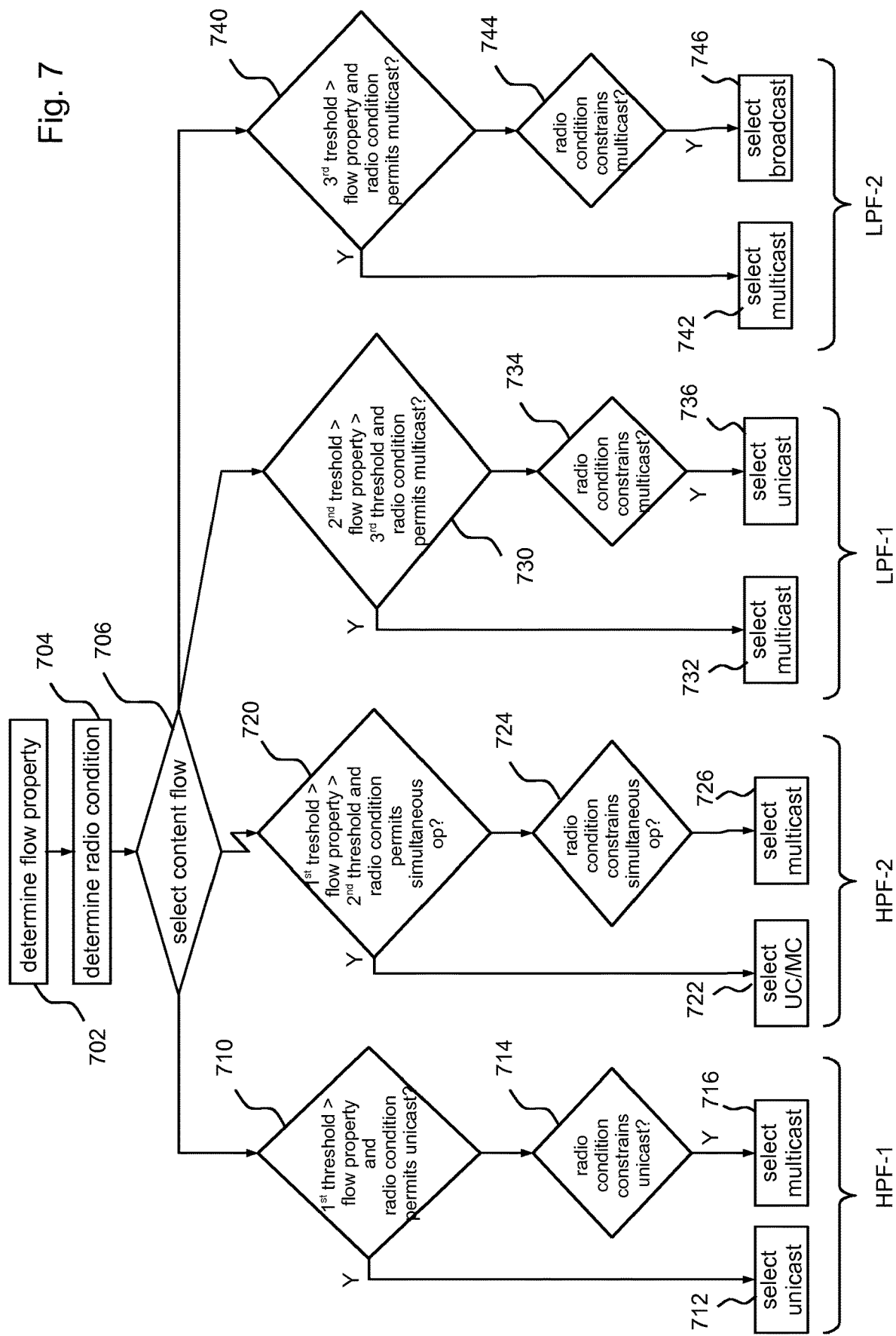

FIG. 7 depicts a schematic flow diagram to operate the network entity. Different branches are provided for the content flows HPF-1, HPF-2, LPF-1, LPF-2. In a step 702, the at least one flow property of at least one of the content flows HPF-1, HPF-2, LPF-1, LPF-2 are determined or provided. In a step 204, the at least one radio condition of the radio cell is determined. According to a step 706 a determination is made for which one of content flows HPF-1, HPF-2, LPF-1, LPF-2 the radio bearers are set up or changed.

The content flows HPF-1, HPF-2, LPF-1, LPF-2 differ for example in their priority in a descending order. In the case of the content flow HPF-1 a determination is made according to a step 710 whether the flow property is above a first upper threshold and above a second lower threshold and whether the downlink radio condition permits the operation of the unicast mapping. If the result of step 710 is affirmative the step 712 provides a selection of the unicast mapping of the content flow HPF-1 to a plurality of unicast bearers between the network entity and the subscribing user equipments. If the result of step 710 is negative a determination according to a step 714 is made whether the downlink radio condition constrains the operation of the unicast mapping. If the result of step 714 is positive a step 716 provides a selection of the multicast mapping of the content flow HPF-1 to a multicast bearer between the network entity and the subscribing user equipments.

In the case of the content flow HPF-2 according to a step 720 a determination is made whether the flow property is below the first upper threshold and above the second lower threshold and whether the downlink radio condition permits the simultaneous operation of a multicast and a unicast mapping. If the result of step 720 is affirmative the step 722 provides a selection a multicast mapping of the content flow HPF-2 to a multicast bearer between the network entity and a first group of the subscribing user equipments and a unicast mapping of the content flow to a plurality of unicast bearers between the network entity and a second group of the subscribing user equipments. If the result of step 720 is negative a determination according to a step 724 is made whether the downlink radio condition constrains the simultaneous operation of the multicast and the unicast mapping. If the result of step 724 is positive a step 726 provides a selection the multicast mapping of the content flow HPF-2 to the multicast bearer between the network entity and the subscribing user equipments. So, a hybrid mapping and hybrid transport for the content flow HPF-2 is provided.

In the case of the content flow LPF-1 according to a step 730 a determination is made whether the flow property is below the second lower threshold and above a third lower threshold and whether the downlink radio condition permits the operation of the multicast mapping. If the result of step 730 is affirmative the step 732 provides a selection of the multicast mapping which maps the content flow LPF-1 to the multicast bearer between the network entity and the subscribing user equipments. If the result of step 730 is negative a determination according to a step 734 is made whether the downlink radio condition constrains the operation of the multicast mapping. If the result of step 734 is positive a step 736 provides a selection of the unicast mapping of the content flow LPF-1 to the plurality of unicast bearers between the network entity and the subscribing user equipments.

In the case of the content flow LPF-2 a determination according to a step 740 is made whether the flow property is below the second lower threshold and below a third lower threshold and whether the downlink radio condition permits the operation of the multicast mapping. If the result of step 740 is affirmative the step 742 provides a selection of the multicast mapping which maps the content flow LPF-2 to the multicast bearer between the network entity and the subscribing user equipments. If the result of step 740 is negative a determination according to a step 744 is made whether the downlink radio condition constrains the operation of the multicast mapping. If the result of step 744 is positive a step 746 provides a selection of a broadcast mapping of the content flow LPF-2 to a broadcast bearer between the network entity and the subscribing user equipments.

The above-referenced thresholds for the flow property are only examples. These can be replace by a configuration, where a certain flow property is linked with a preferred treatment at the network entity. So, these indications comprise a preferred use of the multicast mapping, the unicast mapping or the simultaneous operation of several mappings. Each link between the flow property and the indication which mapping(s) is/are to be preferred can be pre-configured for each network entity.

Figure 8:
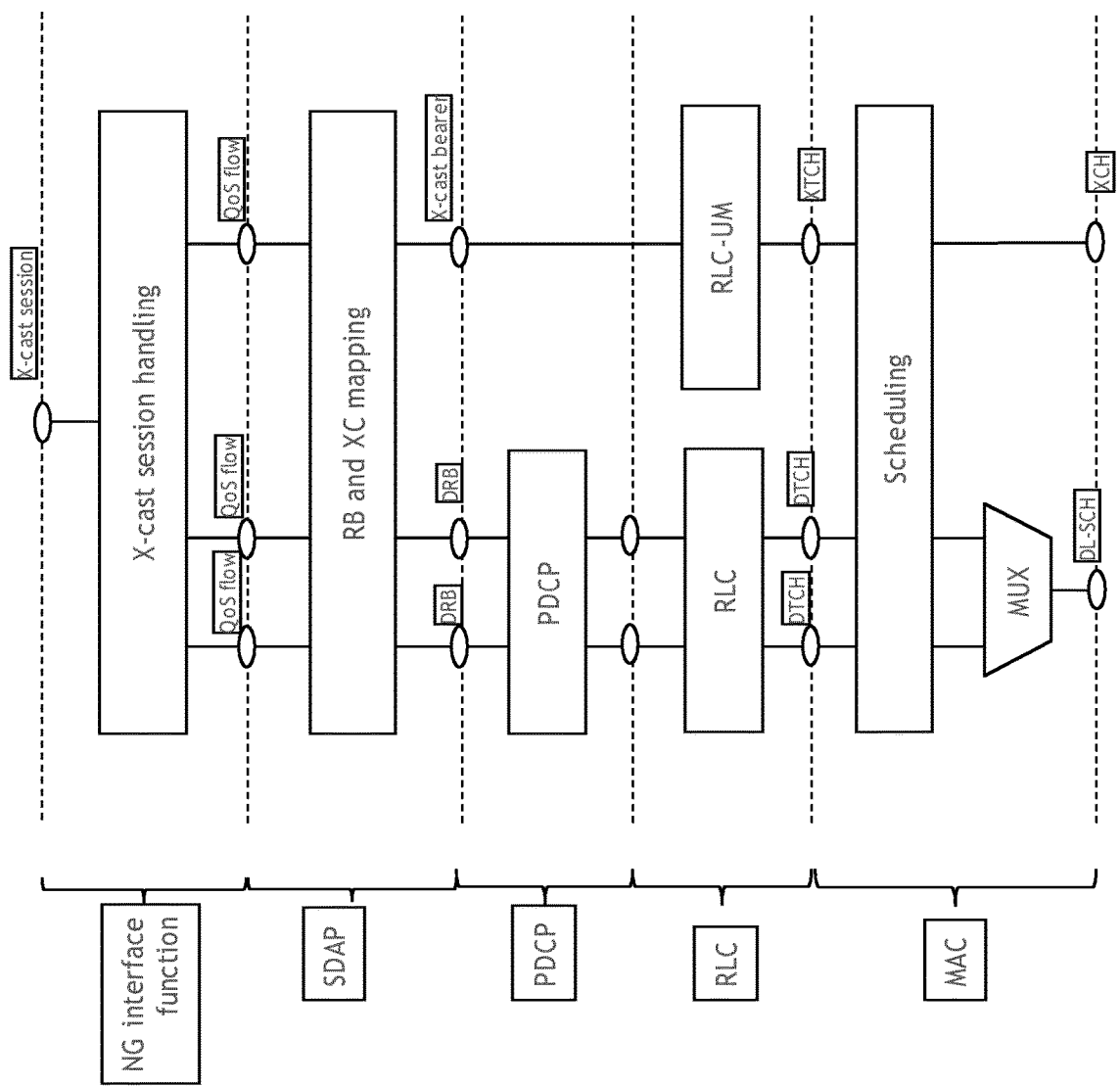
FIG. 8 depicts a schematic a protocol stack.

FIG. 8 depicts a schematic a protocol stack for downlink. An Xcast session is terminating at the network entity gNB from the user plane function, UPF. The Xcast session can contain different QoS flows in the sense of content flows which are marked in the transport header of the next generation, NG, interface. Note that function XC-CF in the UPF can multiplex different IP multi-cast sessions into a single Xcast session. The X-cast session handling function in the gNB delivers QoS flows according to the QFI markings to the Service Data Adaptation Protocol, SDAP, layer. The SDAP layer decides which packets to be mapped to which radio bearers. For Xcast content, the SDAP layer considers the Xcast policies which have been provided by the 5G-CN at establishment of the Xcast session. Based on these policies and based on radio conditions and/or resource consumption, the mapping function decides to map packets either to unicast DRBs, or to an X-cast bearer. QoS Flow Identity, QFI, markings can differentiate between IP multi-cast flows of different sources, or different priorities e.g. for content which consists of different media layers (such as audio, video, VR-related content, etc.). For unicast DRBs, radio link control, RLC, can be configured with acknowledged mode. For X-cast bearers, RLC unacknowledged mode is used. In media access control, MAC, X-cast content mapped to an X-cast bearer is mapped to an X-cast transport channel. Several RLC PDUs can be multiplexed into MAC transport blocks.

The invention claimed is:

1. A method for operating a network entity for a cellular radio access network, the method comprising:
   determining at least one downlink radio condition of the cellular radio access network;
   determining user equipments subscribing to a content flow, wherein the content flow is associated with at least one flow property;
   mapping the content flow to at least one radio bearer in dependence on the at least one downlink radio condition and in dependence on the at least one flow property;
   receiving the content flow; and
   transmitting the content flow according to the determined at least one mapping to the subscribing user equipments.

2. The method according to claim 1, wherein the mapping comprises:
   selecting a unicast mapping of the content flow to a plurality of unicast bearers between the network entity and the subscribing user equipments if the downlink radio condition permits the operation of the unicast mapping and if the flow property indicates the use of the unicast mapping, or
   selecting a multicast mapping of the content flow to a multicast bearer between the network entity and the subscribing user equipments if the downlink radio condition constrains the operation of the unicast mapping and if the flow property indicates the use of the unicast mapping.

3. The method according to claim 2, wherein the unicast bearers differ at least pairwise in a radio numerology.

4. The method according to claim 1, wherein the mapping comprises:
   selecting the multicast mapping of the content flow to the multicast bearer between the network entity and the subscribing user equipments if the downlink radio condition permits the operation of the multicast mapping and if the flow property indicates the use of the multicast mapping, or
   selecting the unicast mapping of the content flow to the plurality of unicast bearers between the network entity and the subscribing user equipments if the downlink radio condition constrains the operation of the multicast mapping and if the flow property indicates the use of the multicast mapping.

5. The method according to claim 1, wherein the mapping comprises:
   selecting a multicast mapping of the content flow to a multicast bearer between the network entity and a first group of the subscribing user equipments and a unicast mapping of the content flow to a plurality of unicast bearers between the network entity and a second group of the subscribing user equipments if the downlink radio condition permits the simultaneous operation of the multicast and the unicast mapping and if the flow property indicates the simultaneous operation, or
   selecting the multicast mapping of the content flow to the multicast bearer between the network entity and the subscribing user equipments if the downlink radio condition constrains the simultaneous operation of the multicast and the unicast mapping and if the flow property indicates the simultaneous operation.

6. The method according to claim 1, wherein the radio condition comprises at least one of the following:
   high/low radio load, a number of available downlink radio resources, a capability indication from the respective user equipment.

7. The method according to claim 1, wherein the downlink radio condition comprises a plurality of downlink radio measurements, the method further comprising:
- transmitting from an antenna array a temporal sequence of control signal beams, wherein the control signal beams radiate from the antenna array in a set of distinct directional patterns, wherein each transmitted control signal beam contains a beam index;
- receiving the downlink radio measurements from a plurality of user equipments, wherein each of the received downlink radio measurements comprises the respective beam index of a control signal beam and a corresponding received signal strength.

8. The method according to claim 7, further comprising
- determining a plurality of downlink signal beams to the subscribing user equipments with a respective minimum signal strength; and,
- determining a multicast mapping comprising the plurality of downlink signal beams;
- wherein the transmitting of the content flow comprises transmitting the content flow according to the determined multicast mapping to the subscribing user equipments.

9. The method according to claim 7, the method further comprising
- determining a respective downlink signal beam to the subscribing user equipments with a maximum signal strength; and,
- determining the respective unicast mapping comprising the respective downlink signal beam with the maximum signal strength;
- wherein the transmitting of the content flow comprises transmitting the unicast content flow according to the determined unicast mappings to the subscribing user equipments.

10. The method according to claim 1, wherein the flow property comprises at least one of the following: a flow priority, a flow reliability, a data rate, a latency constraint, a QoS class identifier, a QFI value, and a 5QI value.

11. The method according to claim 1, wherein the downlink radio condition comprises a plurality of downlink radio resources available for the at least one mapping.

12. The method according to claim 1:
- wherein the determining at least one downlink radio condition comprises aggregating downlink radio conditions from a plurality of sub-entities;
- wherein the mapping comprises mapping the content flow to the at least one radio bearer in dependence on the aggregated downlink radio conditions and in dependence on the at least one flow property;
- wherein the method further comprises providing the determined mapping to respective sub-entities;
- wherein the receiving comprises receiving the content flow at the respective sub-entities; and
- wherein the transmitting comprises transmitting the content flow according to the determined at least one mapping from a respective sub-entity to at least a group of the subscribing user equipments.

13. A network entity for a cellular radio access network, wherein the network entity comprises at least a processor, a memory, and a radio module, and wherein the network entity is configured to:
- determine at least one downlink radio condition of the cellular radio access network;
- determine user equipments subscribing to a content flow wherein the content flow is associated with at least one flow property;
- map the content flow to at least one radio bearer in dependence on the at least one downlink radio condition and in dependence on the at least one flow property;
- receive the content flow; and
- transmit the content flow according to the determined at least one mapping to the subscribing user equipments.

14. The network entity as set forth in claim 13, wherein the network entity is configured to:
- select a unicast mapping of the content flow to a plurality of unicast bearers between the network entity and the subscribing user equipments if the downlink radio condition permits the operation of the unicast mapping and if the flow property indicates the use of the unicast mapping, or
- select a multicast mapping of the content flow to a multicast bearer between the network entity and the subscribing user equipments if the downlink radio condition constrains the operation of the unicast mapping and if the flow property indicates the use of the unicast mapping.

15. The network entity as set forth in claim 13, wherein the network entity is configured to:
- select a multicast mapping of the content flow to the multicast bearer between the network entity and the subscribing user equipments if the downlink radio condition permits the operation of the multicast mapping and if the flow property indicates the use of the multicast mapping, or
- select a unicast mapping of the content flow to the plurality of unicast bearers between the network entity and the subscribing user equipments if the downlink radio condition constrains the operation of the multicast mapping and if the flow property indicates the use of the multicast mapping.

16. The network entity as set forth in claim 13, wherein the network entity is configured to:
- select a multicast mapping of the content flow to a multicast bearer between the network entity and a first group of the subscribing user equipments and a unicast mapping of the content flow to a plurality of unicast bearers between the network entity and a second group of the subscribing user equipments if the downlink radio condition permits the simultaneous operation of the multicast and the unicast mapping and if the flow property indicates the simultaneous operation, or
- select the multicast mapping of the content flow to the multicast bearer between the network entity and the subscribing user equipments if the downlink radio condition constrains the simultaneous operation of the multicast and the unicast mapping and if the flow property indicates the simultaneous operation.

17. The network entity according to claim 13, wherein the downlink radio condition comprises a plurality of downlink radio measurements, the network entity being further configured to:
- transmit from an antenna array a temporal sequence of control signal beams, wherein the control signal beams radiate from the antenna array in a set of distinct directional patterns, wherein each transmitted control signal beam contains a beam index; and,
- receive the downlink radio measurements from a plurality of user equipments, wherein each of the received downlink radio measurements comprises the respective beam index of a control signal beam and a corresponding received signal strength.

18. The network entity according to claim 17, further being configured to:
- determine a plurality of downlink signal beams to the subscribing user equipments with a respective minimum signal strength; and,
- determine a multicast mapping comprising the plurality of downlink signal beams;
- wherein being configured to transmit the content flow comprises being configured to transmit the content flow according to the determined multicast mapping to the subscribing user equipments.

19. The network entity according to claim 17, further being configured to:
- determine a respective downlink signal beam to the subscribing user equipments with a maximum signal strength; and,
- determine a respective unicast mapping comprising the respective downlink signal beam with the maximum signal strength;
- wherein being configured to transmit the content flow comprises being configured to transmit the unicast content flow according to the determined unicast mappings to the subscribing user equipments.

20. A network entity for a cellular radio access network, wherein the network entity comprises at least a processor, a memory, and a radio module, and wherein the network entity is configured to:
- aggregate downlink radio conditions which are determined at a plurality of sub-entities;
- map the content flow to at least one radio bearer in dependence on the aggregated downlink radio conditions and in dependence on at least one flow property;
- provide the determined mapping to respective sub-entities;
- receive the content flow at the respective sub-entities; and
- transmit the content flow according to the determined at least one mapping from a respective sub-entity to at least a group of subscribing user equipments.

\* \* \* \* \*